United States Patent
Chen et al.

(10) Patent No.: US 7,272,011 B2
(45) Date of Patent: Sep. 18, 2007

(54) COMPUTER ENCLOSURE WITH ROTATABLE COVER MOUNTING ASSEMBLY

(75) Inventors: Yun-Lung Chen, Tu-Cheng (TW); Jun Tang, Shenzhen (CN); Jian Hu, Shenzhen (CN)

(73) Assignees: Hong Fu Jin Precision Industry (Shenzhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 18 days.

(21) Appl. No.: 11/288,854

(22) Filed: Nov. 29, 2005

(65) Prior Publication Data

US 2006/0291155 A1    Dec. 28, 2006

(30) Foreign Application Priority Data

Jun. 22, 2005    (CN) .................. 2005 2 0060523

(51) Int. Cl.
*H05K 7/16* (2006.01)
(52) U.S. Cl. ................................. 361/726
(58) Field of Classification Search ........... 361/683, 361/724, 725, 726, 727, 685; 439/53, 153, 439/157; 16/404; 312/223.1, 223.2
See application file for complete search history.

(56) References Cited

U.S. PATENT DOCUMENTS 5,197,789 A * 3/1993 Lin .................... 312/223.2
6,157,532 A * 12/2000 Cook et al. ............... 361/681
6,583,983 B1 * 6/2003 Chen et al. ............... 361/683
6,721,183 B1    4/2004 Chen et al.
7,072,177 B2 * 7/2006 Peng et al. ............... 361/685
7,082,036 B2 * 7/2006 Cheng et al. ............. 361/726
7,110,251 B2 * 9/2006 Wu .......................... 361/685
7,142,431 B2 * 11/2006 Li et al. .................. 361/726
2002/0167790 A1 * 11/2002 Gan ......................... 361/683
2005/0007734 A1 * 1/2005 Peng et al. ............... 361/685
2005/0148228 A1 * 7/2005 Jing et al. ................ 439/325
2005/0183100 A1 * 8/2005 Chung ...................... 720/600
2006/0034046 A1 * 2/2006 Chen et al. ............... 361/683

FOREIGN PATENT DOCUMENTS

| TW | 452110 | 8/2001 |
| TW | 566802 | 12/2003 |

* cited by examiner

*Primary Examiner*—Chandrika Prasad
(74) *Attorney, Agent, or Firm*—Morris Manning & Martin LLP; Tim Tingkang Xia, Esq.

(57) ABSTRACT

A mounting assembly for computer cover includes a chassis having a rearwall, a cover mounted to the chassis, a first connecting bar and second connecting bar movably mounted on the rearwall of the chassis and a driving member mounted on the chassis. The cover has two opposite sidewalls. A protrusion extends from each of the sidewalls. Each of the two connecting bars forms a stopping portion for engaging with the protrusion. A driving portion is provided on the driving member for urging the two connecting bars to move. The driving portion of the driving member drives the two connecting bars to urge the stopping portions to disengage from the protrusions when the driving member is driven.

17 Claims, 5 Drawing Sheets

COMPUTER ENCLOSURE WITH ROTATABLE COVER MOUNTING ASSEMBLY

BACKGROUND OF THE INVENTION

1. Field of the Invention

The present invention relates to computer enclosures, and more particularly to a computer enclosure with a cover that can be easily removed and reattached as necessary.

2. Background of the Invention

With the popularization of computer, there is a growing need to make repairs or upgrades thereto. A cover of the computer may need to be frequently removed and then reattached. Typically, a cover mounting assembly generally utilizes a plurality of screws, which directly attach the cover to a chassis of the computer. Thus, a screwdriver or another tool is necessary for installation or removal of the cover, which causes inconvenience and time waste. Lately, many new mounting assembly designs have been introduced into the market. Some of the mounting assemblies do not require the use of screwdrivers or other tools during the course of removing the cover. These types of mounting assemblies are anticipated to become popular, owing to convenience.

A typical traditional mounting assembly utilizing screws for a computer cover includes a computer chassis, a cover, and two symmetrical plates. The chassis includes a bottom panel, a top panel, a front panel, and a rear panel. A flange is vertically formed at an edge of each panel. Each adjacent flange symmetrically forms a first side frame and a second side frame. A supporting panel is mounted to the inner side of the first side frame. The two side edges of the cover are both bent to form a rim, defining a plurality of hooks. The hooks are for clipping in corresponding holes of the chassis respectively, thereby assembling the cover, the first side frame and the second side frame together. However, the mounting assembly utilizes a plurality of screws to secure the cover, and a screwdriver or another tool is required during the course of attaching or removing the cover. Therefore, it is complicated and inconvenient to attach and remove the cover.

A typical mounting assembly not requiring the use of a screwdriver is arranged at an end of a computer chassis for removing or attaching a computer cover. A rearwall of the chassis is bent inward to form a supporting plate, and a hole is defined in the supporting plate. The cover is bent inward to form a locking tab and a second abutting portion. The locking tab has a locking opening defined therein. The mounting assembly includes a lever having a locking portion and a first abutting portion, and a resilient device located between the supporting plate and the lever. The locking opening of the locking tab engagingly receives the locking portion, thereby completing attachment of the cover to the chassis. Pulling the lever can release the locking portion from the locking opening, whereupon the first abutting portion of the lever pushes the second abutting portion of the cover, thereby allowing removal of the cover from the chassis. Although the mounting assembly does not require the use of a screwdriver, the above-described operation of the mounting assembly is unduly complicated.

What is needed, therefore, is a mounting assembly with a simplified configuration, that conveniently allows the removal and attachment of a cover from and onto a computer chassis.

SUMMARY

A mounting assembly in accordance with a preferred embodiment of the present invention includes a chassis having a rearwall, a cover mounted to the chassis, a first connecting bar and second connecting bar movably mounted on the rearwall of the chassis, and a driving member mounted on the chassis. The cover has two opposite sidewalls. A protrusion extends from each of the sidewalls. Each of the two connecting bars forms a stopping portion for engaging with the protrusion. A driving portion is provided on the driving member for urging the two connecting bars to move. The driving portion of the driving member drives the two connecting bars to urge the stopping portions to disengage from the corresponding protrusions when the driving member is driven. The cover is therefore easily removed from the chassis.

Other advantages and novel features will be drawn from the following detailed description of preferred embodiments with the attached drawings, in which:

DETAILED DESCRIPTION OF THE INVENTION

Figure 1:
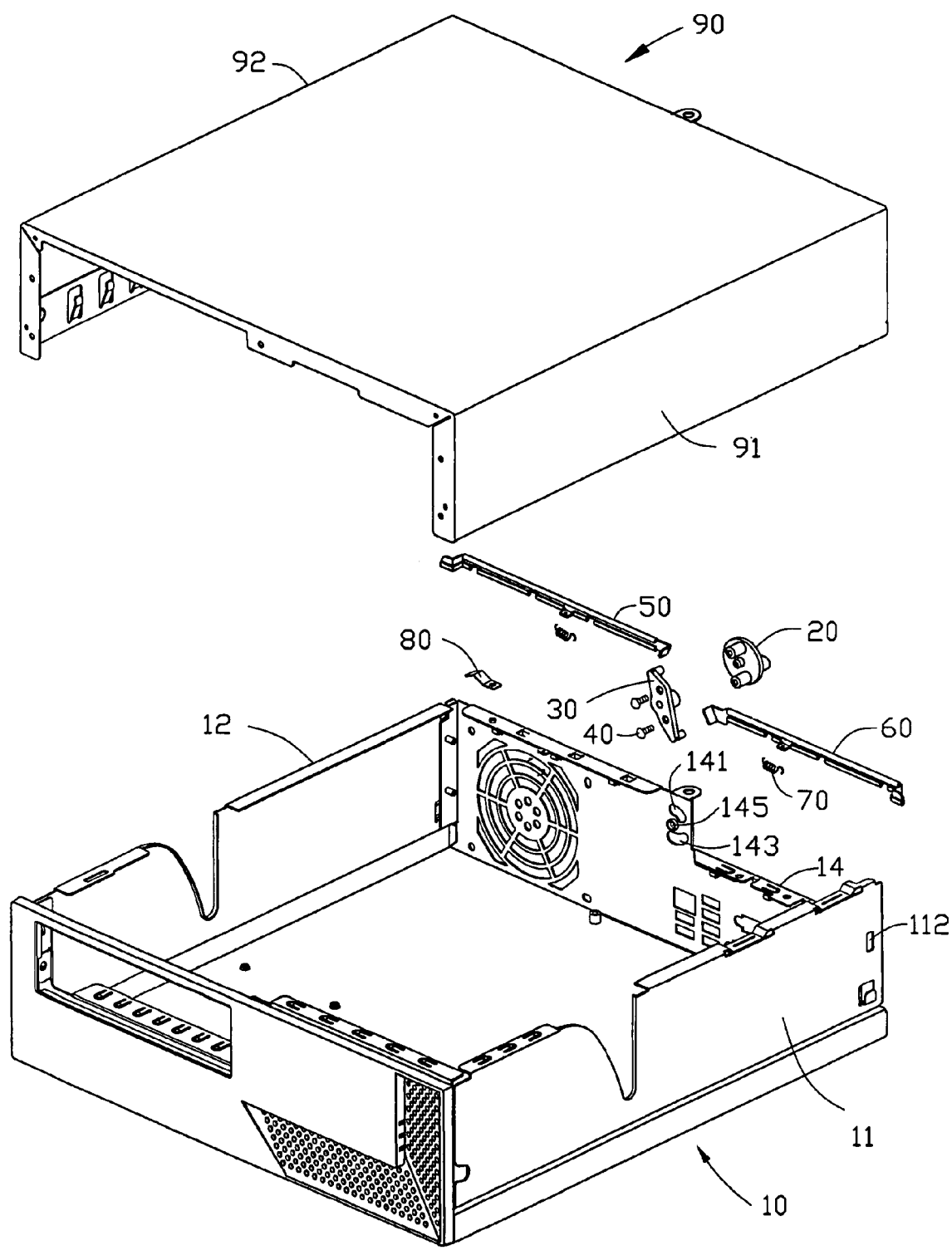
FIG. 1 is an exploded, isometric view of a mounting assembly in accordance with a preferred embodiment of the present invention, the mounting assembly including a cover, a first connecting bar, a second connecting bar, a rotating member, a driving member, two screws, two springs, and a chassis.

Referring to FIG. 1, a mounting assembly of an enclosure of an electronic device like a computer in accordance with a preferred embodiment of the present invention includes a chassis 10, a rotating member 20, a driving member 30, a pair of screws 40, a first connecting bar 50, a second connecting bar 60, a pair of springs 70, an elastic tab 80 and a cover 90. In an alternative embodiment of the present invention, the springs 70 can be other elastic components such as resilient cylinders.

Figure 4:
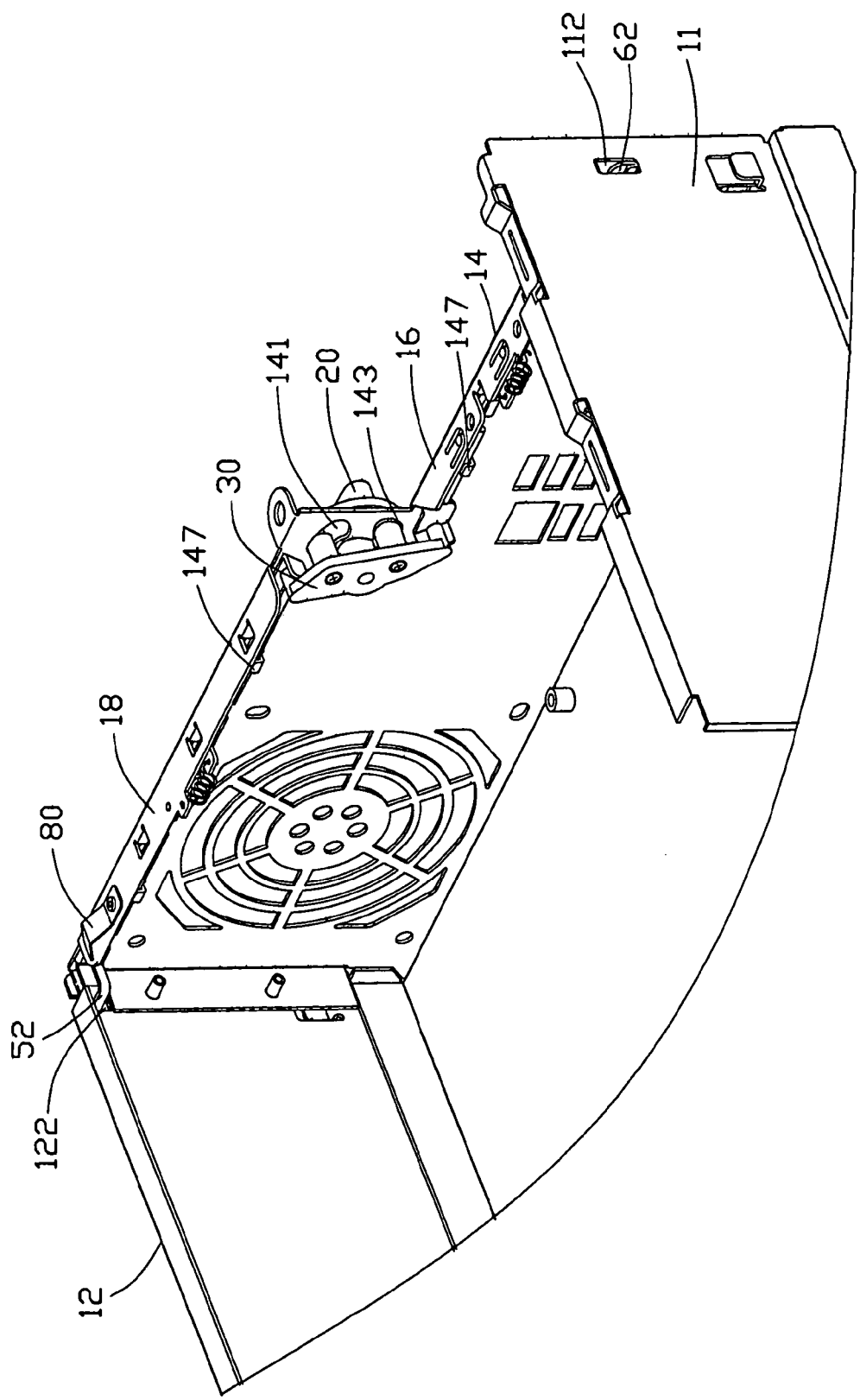
FIG. 4 is an enlarged view of a rear part of the chassis of FIG. 1, showing all of the other parts of the mounting assembly except the cover attached thereto.

Referring also to FIG. 4, the chassis 10 includes two opposite sidewalls 11, 12, and a rearwall 14 between the sidewalls 11, 12. A through slot 112 is defined in a rear end of the sidewall 11 of the chassis 10. A through slot 122 is also defined in a rear end of the sidewall 12 of the chassis 10. A recess (not labeled) having a curve side is defined on each of the sidewall 12. The rearwall 14 is bent perpendicularly inward to form two flanges 16, 18, and the flanges 16, 18 both define a through hole (not labeled) respectively for connecting of ends of the springs 70 thereat respectively. An elastic tab 80 is riveted on the flange 18, for lifting the cover 90 up. A plurality of L-shaped supporting tabs 147 extends inward form the rearwall 14 of the chassis 10 below the two flanges 16,18. Two inclined through slots 141, 143 are defined in the rearwall 14 of the chassis 10 between the two flanges 16, 18. Moreover, a positioning hole 145 is defined in the rearwall 14 between the two through slots 141, 143.

Figure 2:
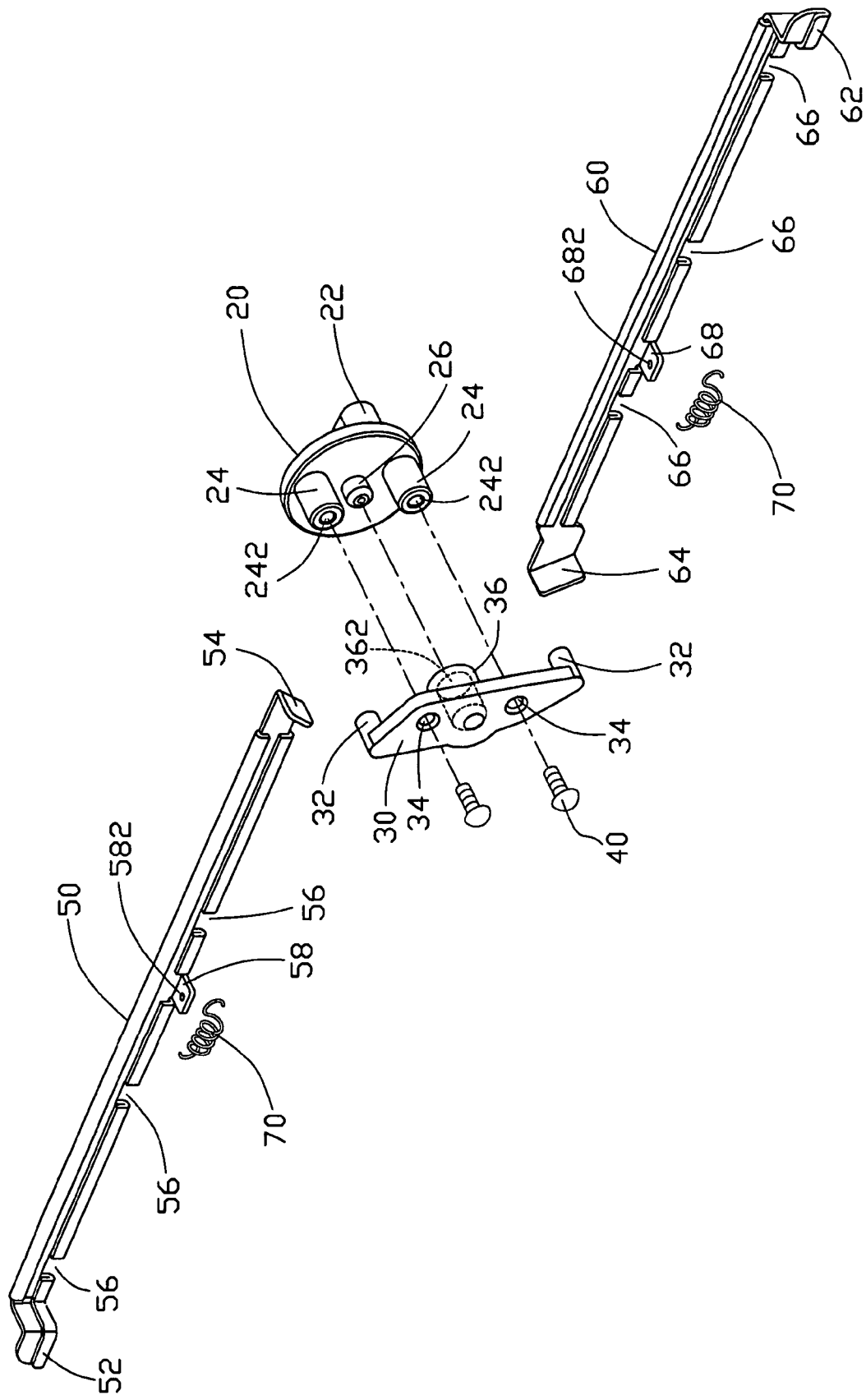
FIG. 2 is an enlarged view of the first connecting bar, the second connecting bar, the rotating member, the driving member, the screws and the springs of FIG. 1.

Referring to FIG. 2, the rotating member 20 is formed to have a rotating portion 22 at one side thereof, and a pair of circular posts 24 at the other side thereof. A screw hole 242 is defined in each circular post 24. A positioning pillar 26 is perpendicularly formed on the rotating member 20 between the two circular posts 24. A driving portion 32 is formed on the driving member 30 at each end thereof. A pair of circular holes 34 is defined in the driving member 30 between the two driving portions 32, corresponding to the two circular posts 24 of the rotating member 20. The screws 40 extend through the two circular holes 34 to engage in the screw holes 242 respectively. A locating post 36 is formed on the driving member 30 between the two circular holes 34. A counterbore 362 is defined in the locating post 36. The diameter of the locating post 36 is larger than that of the positioning hole 145 of the rearwall 14, for preventing the locating post 36 from extending through the positioning hole 145. A stopping portion 52 is formed at one end of the first connecting bar 50, and a pressed portion 54 is formed at the other end of the first connecting bar 50. A plurality of cutouts 56 is defined in the first connecting bar 50. A protruding tab 58 extends outwardly from the first connecting bar 50 between centermost of the two cutouts 56. A through hole 582 is defined in the protruding tab 58, for connecting of the other end of a corresponding one of the springs 70. The second connecting bar 60 has generally the same structure as that of the first connecting bar 50, except that the structure of the second connecting bar 60 is generally symmetrical to that of the first connecting bar 50. The second connecting bar 60 is formed to have a stopping portion 62 at one end thereof, and a pressed portion 64 at the other end thereof. A plurality of cutouts 66 is defined in the second connecting bar 60 between the stopping portion 62 and the pressed portion 64. A protruding tab 68 extends outwardly from the second connecting bar 60 between two centermost of the cutouts 66. A through hole 682 is defined in the protruding tab 68, for connecting of the other end of a corresponding one of the springs 70.

Figure 3:
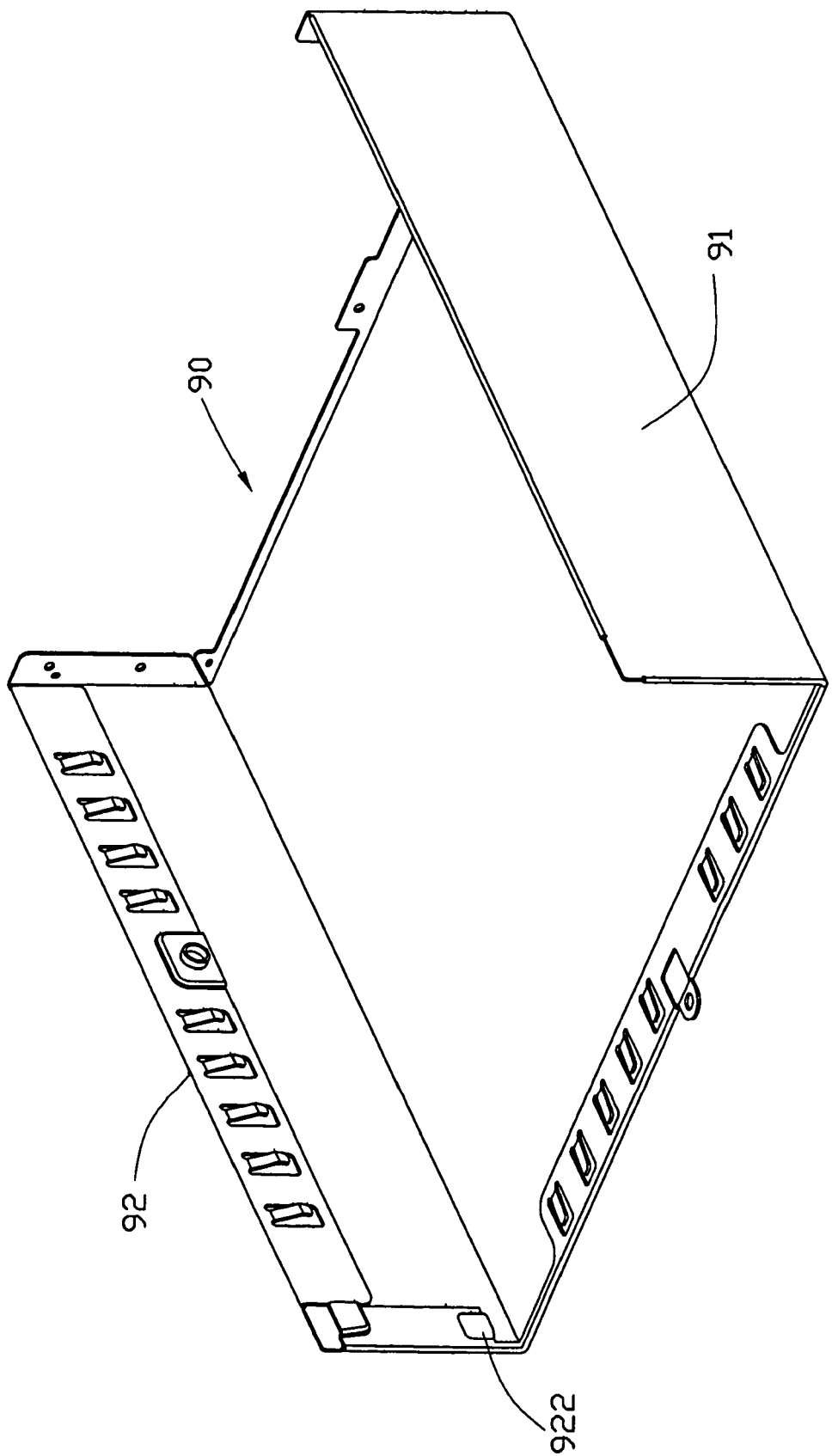
FIG. 3 is an isometric view of the cover of FIG. 1, but viewed from another aspect.

Referring to FIG. 3, the cover 90 includes opposite sidewalls 91, 92. One protrusion (not visible) is formed at a front inner side of the sidewall 91. Another protrusion 922 is also formed at a front inner side of the sidewall 92. After mounting the cover 90 to the chassis 10, the protrusion 922 of the sidewall 92 aligns below the through slot 122 of the sidewall 12 of the chassis 10, and the protrusion of the sidewall 91 aligns below the through slot 112 of the sidewall 11 of the chassis 10. A knob (not labeled) extends from each of the sidewalls 92 and is receivable in the corresponding recess of the sidewall of the chassis 10.

Referring also to FIG. 4, when mounting the cover 90 to the chassis 10, the cutouts 56 of the first connecting bar 50 are aligned with the corresponding supporting tabs 147 of the chassis 10 respectively, and then the first connecting bar 50 is moved toward the supporting tabs 147 until the first connecting bar 50 is received in a space formed between the supporting tabs 147 and the flange 18. Furthermore, the first connecting bar 50 is moved horizontally until the stopping portion 52 of the first connecting bar 50 extends through the through slot 122. Similarly, the cutouts 66 of the second connecting bar 60 are aligned with the corresponding supporting tabs 147 of the chassis 10 respectively, and then the second connecting bar 60 is moved toward the supporting tabs 147 until the second connecting bar 60 is received in a space formed between the supporting tabs 147 and the flange 16. Furthermore, the second connecting bar 60 is moved horizontally until the stopping portion 62 thereof extends through the through slot 112. In addition, the circular posts 24 of the rotating member 20 extend through the guiding slots 141, 143 of the rearwall 14 of the chassis 10 and align with the two circular holes 34 respectively. Simultaneously, the positioning pillar 26 extends through the positioning hole 145 of the rearwall 14 and becomes tightly seated in the counterbore 362 of the locating post 36 of the driving member 30. The screws 40 are extended through the circular holes 34 to engage in the screw holes 242 of the circular posts 24 respectively, thereby mounting the rotating member 20 and the driving member 30 on the chassis 10. Simultaneously, the driving portions 32 of the driving member 30 abut against the pressed portions 54, 64 of the first and second connecting bars 50, 60 respectively. Finally, one end of one of the springs 70 is engaged in the through hole 582 of the first connecting bar 50, and the other end of this spring 70 is engaged in the through hole (not labeled) of the flange 18 of the chassis 10. In the same way, the other spring 70 is connected between the second connecting bar 60 and the flange 16 of the chassis 10. Thus, the first connecting bar 50 and second connecting bar 60 are slidably mounted on the chassis 10.

Figure 5:
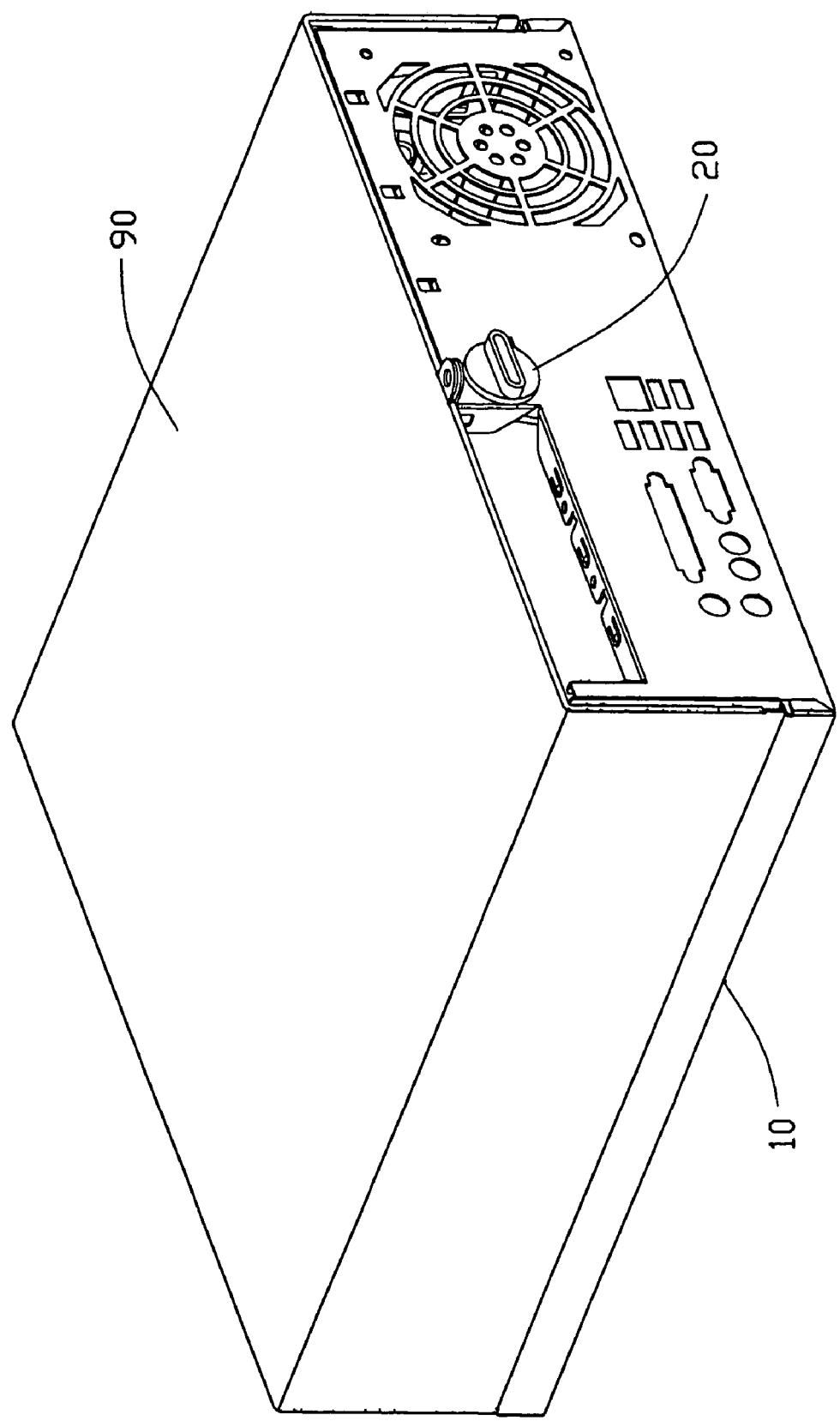
FIG. 5 is an assembled view of the mounting assembly of FIG. 1, but viewed from a rear aspect.

Referring also to FIG. 5, in use, the rotating portion 22 of the rotating member 20 is held and rotated. The driving member 30 is thus rotated along with the rotating member 20. Consequently, the driving portions 32 of the driving member 30 push against the pressed portions 54, 64 of the first and second connecting bars 50, 60, thereby urging the first and second connecting bars 50, 60 to slide horizontally and inward. When the stopping portions 52, 62 of the first and second connecting bar 50, 60 are drawn back into the through slots 122, 112, the cover 90 is pressed downwardly when the knob travels along the curve side of the recess of the sidewalls of the chassis so that the protrusion 922 of the sidewall 92 and the protrusion of the sidewall 91 align below the through slot 122, 112. Finally, when the rotating member 20 is released, the first and second connecting bar 50, 60 return to their original positions due to rebounding of the springs 70. Thereby, the stopping portion 52 of the first connecting bar 50 prevents the protrusion 922 of the sidewall 92 from moving vertically, and the stopping portion 62 of the second connecting bar 60 prevents the protrusion of the sidewall 91 from moving vertically. Thus, the cover 10 is securely mounted to the chassis 50.

In removal of the cover 90, the rotating portion 22 of the rotating member 20 is held and rotated. The driving member 30 is thus rotated along with the rotating member 20. Consequently, the driving portions 32 of the driving member 30 push against the pressed portions 54, 64 of the first and second connecting bars 50, 60, thereby urging the first and second connecting bars 50, 60 to slide horizontally and inward. When the stopping portions 52, 62 of the first and second connecting bars 50, 60 draw back into the through slots 122, 112, the cover 90 is automatically lifted up by the elastic tab 80. After the cover 90 is removed, the first and second connecting bars 50, 60 return to their original positions due to releasing of the rotating member 20.

In addition, in an alternative embodiment of the present invention, the rotating member 20 and the driving member 30 can be replaced by a pivoting member. In such case, the pivoting member is formed to have a rotating portion and a driving portion.

While the present invention has been illustrated by the description of preferred embodiments thereof, and while the preferred embodiments have been described in considerable detail, it is not intended to restrict or in any way limit the scope of the appended claims to such details. Additional advantages and modifications within the spirit and scope of the present invention will readily appear to those skilled in the art. Therefore, the present invention is not limited to the specific details and illustrative examples shown and described.

We claim:

1. A mounting assembly of a computer enclosure, comprising:
   a chassis having a rearwall and a pair of sidewalls perpendicular thereto;
   a cover adapted to be mounted to the chassis, the cover having two opposite sidewalls, a protrusion extending from each of the sidewalls;
   a first connecting bar and a second connecting bar movably mounted on the rearwall of the chassis, each connecting bar comprising a slanted pressed portion formed at one end thereof and a stopping portion formed at the other end thereof for engaging with a corresponding one of the protrusions; and
   a driving member mounted on the chassis, a pair of driving portions perpendicular to the rearwall of the chassis formed on the driving member at opposite ends thereof for engaging with the pressed portions of the two connecting bars, whereby when the driving member is driven, the driving portions of the driving member drive the pressed portions thereby urging the connecting bars to move toward each other and retract into the chassis and the stopping portions to disengage from the protrusions.

2. The mounting assembly of a computer enclosure as described in claim 1, further comprising two elastic members for driving the two connecting bars to return to a starting position engaging with the protrusions of the cover, one elastic member being connected between the chassis and the first connecting bar, the other elastic member being connected between the chassis and the second connecting bar.

3. The mounting assembly of a computer enclosure as described in claim 1, further comprising a rotating member connected with the driving member for rotating the driving member.

4. The mounting assembly of a computer enclosure as described in claim 3, wherein the rearwall of the chassis defines a pair of guiding slots therein, and the rotating member forms a pair of posts extending through the guiding slots respectively.

5. The mounting assembly of a computer enclosure as described in claim 4, wherein a positioning pillar is formed on the rotating member between the two circular posts, and the rearwall of the chassis defines a positioning hole therein, the positioning hole receiving the positioning pillar therein.

6. The mounting assembly of a computer enclosure as described in claim 1, wherein each sidewall of the chassis defines a through slot therein, with the stopping portion of the corresponding connecting bar extending through the through slot.

7. The mounting assembly of a computer enclosure as described in claim 1, wherein a plurality of supporting tabs extends from the chassis for supporting the two connecting bars.

8. The mounting assembly of a computer enclosure as described in claim 1, wherein at least one elastic tab is mounted on the chassis for lifting the cover up.

9. A mounting assembly of a computer enclosure, comprising:
   a cover having at least one sidewall;
   a chassis having a rearwall and two sidewalls, a pair of homocentric arcuate guiding slots defined in the rearwall, at least one of the sidewalls defining a through slot;
   at least one connecting bar slidably mounted on the chassis, a stopping portion forming on the connecting bar for extending through the through slot;
   a pivoting member with a pair of posts extending through the pair of guiding slots pivotably mounted on the rearwall of the chassis, the pivoting member engaging with the connecting bar, whereby when the pivoting member is pivoted, the stopping portion of the connecting bar is disengaged from the sidewall of the cover; and
   at least one elastic member being connected between the rear wall of the chassis and the at least one connecting bar, for providing a force to drive the connecting bar to extend through the through slot of the chassis and engage with the cover.

10. The computer enclosure as described in claim 9, wherein a protrusion extends from an inner side of a sidewall of the cover, for engaging with the stopping portion of the connecting bar.

11. The computer enclosure as described in claim 9, wherein the pivoting member comprises a rotating member mounted on the chassis and a driving member connected with the rotating member.

12. The computer enclosure as claimed in the claim 11, wherein a pressed portion is provided on the connecting bar, the driving member driving the connecting bar via the pressed portion.

13. The computer enclosure as described in the claim 11, wherein a positioning pillar is formed on the rotating member between the two posts, and the rearwall of the chassis defines a positioning hole therein, the positioning hole receiving the positioning pillar therein.

14. The computer enclosure as described in the claim 9, wherein a plurality of supporting tabs extends from the chassis for supporting the connecting bar.

15. An electronic device comprising:
   a chassis of said electronic device defining an inner space for receiving components of said electronic device therein, said chassis comprising two sidewalls spaced from each other beside said inner space;
   a cover movably enclosing said inner space of said chassis incorporating with said chassis and capable of abutting against said two sidewalls of said chassis when said cover moves to settle on said chassis;
   a mounting assembly disposed in one of said chassis and said cover, said mounting assembly comprising a pivoting member pivotably mounted between said two spaced sidewalls of said chassis and spaced therefrom, said pivoting member having at least one post at one of opposite ends thereof, and at least one connecting bar movably mounted and extending between said pivoting member and one of said two sidewalls of said chassis, said at least one connecting bar engagable with said pivoting member and resiliently movable between a first position thereof where said at least one connecting bar engages with the other of said chassis and said cover to position said cover onto said one of said two sidewalls when said cover moves to settle on said chassis, and a second position thereof where said at least one connecting bar disengages from said other of said chassis and said cover to release said cover, rotation of said pivoting member capable of controllably urging movement of said at least one connecting bar between said first and second positions thereof; and at least one elastic member connected between said one of said chassis and said cover and said at least one connecting bar, said pivoting member being rotated with the at least one post driving said at least one connecting bar to retract into said chassis to said second position and elongate said at least one elastic member, said at least one connecting bar being moved to said first position due to rebounding of said elastic member.

16. The electronic device as described in claim 15, further comprising another connecting bar movably mounted and extending between said pivoting member and the other of said two sidewalls of said chassis, an offset defined between an extension direction of said another connecting bar and an extension direction of said at least one connecting bar.

17. The electronic device as described in claim 15, further comprising a recess defined on each of said two sidewalls so as to control movement of said cover settling onto said chassis.

* * * * *